(12) United States Patent
Chen et al.

(10) Patent No.: US 11,390,742 B2
(45) Date of Patent: Jul. 19, 2022

(54) EPOXY BASED COMPOSITION

(71) Applicant: Henkel AG & Co. KGaA, Duesseldorf (DE)

(72) Inventors: Chunfu Chen, Kawasaki (JP); Bin Li, Shanghai (CN); Chao Wang, Shanghai (CN); Shuichi Iwasaki, Kawasaki (JP); Masao Kanari, Kawasaki (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/004,196

(22) Filed: Aug. 27, 2020

(65) Prior Publication Data
US 2020/0392329 A1    Dec. 17, 2020

Related U.S. Application Data

(63) Continuation of application No. PCT/CN2017/119196, filed on Dec. 28, 2017.

(51) Int. Cl.
| | | |
|---|---|---|
| *B32B 27/38* | (2006.01) | |
| *B32B 27/26* | (2006.01) | |
| *C09J 163/08* | (2006.01) | |
| *C09J 163/00* | (2006.01) | |
| *C08G 59/34* | (2006.01) | |
| *C08G 59/66* | (2006.01) | |
| *C08G 59/68* | (2006.01) | |
| *C08L 63/04* | (2006.01) | |
| *C08G 59/22* | (2006.01) | |
| *C08G 59/32* | (2006.01) | |
| *C08K 5/17* | (2006.01) | |
| *C08K 5/3415* | (2006.01) | |
| *C08K 5/37* | (2006.01) | |
| *C08L 63/08* | (2006.01) | |
| *C08G 59/38* | (2006.01) | |

(52) U.S. Cl.
CPC .............. *C08L 63/04* (2013.01); *B32B 27/38* (2013.01); *C08G 59/22* (2013.01); *C08G 59/32* (2013.01); *C08G 59/34* (2013.01); *C08G 59/66* (2013.01); *C08G 59/686* (2013.01); *C08K 5/17* (2013.01); *C08K 5/3415* (2013.01); *C08K 5/37* (2013.01); *C08L 63/08* (2013.01); *C09J 163/08* (2013.01); *C08L 2312/06* (2013.01)

(58) Field of Classification Search
None
See application file for complete search history.

(56) References Cited

U.S. PATENT DOCUMENTS 3,030,336 A * 4/1962 Greenspan ............ C08F 136/06
528/392
4,177,173 A * 12/1979 Carr ........................ C08G 59/66
528/88

\* cited by examiner

*Primary Examiner* — Michael J Feely
(74) *Attorney, Agent, or Firm* — Steven C. Bauman

(57) ABSTRACT

This invention relates to an epoxy based composition, comprising at least one epoxidized unsaturated polyolefin; at least one thiol compound; and at least one curing catalyst. The epoxy based composition according to the present invention exhibits fast curing property under UV light and has improved adhesion strength after being further heated.

14 Claims, No Drawings

EPOXY BASED COMPOSITION

TECHNICAL FIELD

This invention relates to an epoxy based composition, comprising at least one epoxidized unsaturated polyolefin; at least one thiol compound; and at least one curing catalyst. The epoxy based composition according to the present invention exhibits fast curing property under UV light and has improved adhesion strength after being further heated.

BACKGROUND OF THE INVENTION

Epoxy based adhesive is one of the most important and widely used adhesive for structural bonding applications due to its excellent adhesion strength to various materials, chemical stability and low shrinkage property.

Despite all the advantages of epoxy based adhesive, the traditional epoxy based adhesive has the drawback of slow curing, which limits the application of the epoxy based adhesive. One solution to solve the slow curing problem is to incorporate acrylate compounds into the adhesive formula. The incorporation of acrylate compounds, however, will damage the humidity reliability performance and deteriorate the low shrinkage property of the epoxy based adhesive.

Therefore, there is a need for developing an epoxy based composition, which can be quickly cured under UV light, and has improved adhesion strength after being further heated.

SUMMARY OF THE INVENTION

The present invention relates to an epoxy based composition, comprising:
(a) at least one epoxidized unsaturated polyolefin;
(b) at least one thiol compound; and
(c) at least one curing catalyst. The epoxy composition of the invention exhibits fast curing property under UV light and has improved adhesion strength after being further heated.

The present invention also relates to a cured product of the epoxy based composition.

The present invention also relates to an article bonded by the epoxy based composition.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points. All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

Epoxidized Unsaturated Polyolefin

The epoxidized unsaturated polyolefin of the present invention refers to a polyolefin with at least one non-aromatic double bond and at least one epoxy group.

In some embodiments of the present invention, the epoxidized unsaturated polyolefin prefers to have at least two non-aromatic carbon-carbon double bonds.

In some embodiments of the present invention, the epoxidized unsaturated polyolefin prefers to have at least two epoxy groups.

In some embodiments of the present invention, the epoxidized unsaturated polyolefin is epoxidized polydiene, preferably selected from epoxidized polyisoprene, epoxidized polybutadiene, epoxidized copolymer of isoprene and butadiene, epoxidized copolymer of butadiene and ethylene, epoxidized copolymer of butadiene and propylene, and epoxidized terpolymer of butadiene, ethylene and propylene.

In some embodiments of the present invention, the epoxidized unsaturated polyolefin may be prepared by copolymerizing at least one epoxidized olefin monomer with at least one unsaturated comonomer. In a preferred embodiment, the epoxidized olefin monomer consists of a straight carbon chain with at least 4 carbon atoms, at least one carbon-carbon double bond and at least one epoxy group; and the unsaturated comonomer consists of a straight carbon chain with at least 4 carbon atoms and at least two carbon-carbon double bonds. 3,4-epoxy-1-butene is a preferred epoxidized olefin monomer. As a comonomer, a diene compound is preferred, e.g. 1,3-butadiene, 1,7-octadiene, 1,9-decadiene, 1,11-dodecadiene, or any combination thereof. Specific example of the epoxidized unsaturated polyolefin is shown below.

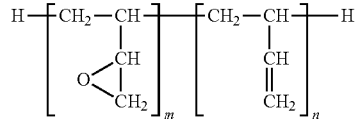

wherein m denotes repeat number of epoxidized olefin monomer unit in [ ], and is an integer greater than or equal to 1, and n denotes repeat number of unsaturated comonomer unit in [ ], and is an integer greater than or equal to 1.

Examples of commercially available epoxidized unsaturated polyolefin are, for example, JP-100, JP-200 and JP-400 from Nippon Soda Co., Ltd.; PB 3600 and PB 4700 from Daicel Corporation; and Poly BD 600E from Total Gray Valley.

In some embodiments of the present invention, the amount of epoxidized unsaturated polyolefin in the epoxy based composition of the invention is from 1% to 90%, preferably from 3% to 70%, and more preferably from 35% to 65% by weight based on the total weight of the composition.

Thiol Compound

The thiol compound of the present invention refers to any mercapto compound which has at least one thiol group per molecule. Preferably, the thiol compound has at least two thiol groups per molecule. The thiol compound may be selected from aliphatic, cycloaliphatic, aromatic thiols and any combination thereof. Illustrative thiol compounds are methanedithiol, propanedithiol, cyclohexanedithiol, trimethylolpropane tris(3-mercaptopropionate), trimethylolpropane tris (thioglycolate), pentaerythritol tetrakis (thioglycolate), pentaerythritol tetrakis (beta-mercaptopropionate), dipentaerythritol poly (beta-mercaptopropionate), ethylene glycol bis (beta-mercaptopropionate) and alkyl polythiols such as butane-1,4-dithiol, hexane-1,6-dithiol, and aromatic polythiols such as p-xylenedithiol and 1,3,5-tris (mercaptomethyl) benzene. Specific example of the thiol compound is shown below.

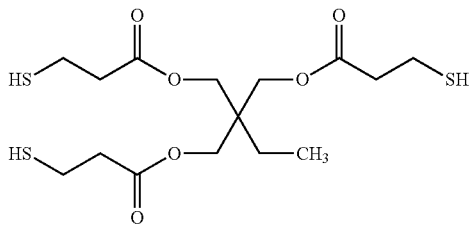 [SMILES: CCC(COC(=O)CCS)(COC(=O)CCS)COC(=O)CCS]

Examples of commercially available thiol compounds are, for example, TMTP (trimethylolpropane tris(3-mercaptopropionate)) from Yodo Kagaku Co., Ltd.; PEMP (pentaerythritol tetrakis (3-mercaptopropionate)) from SC Organic Chemical Co., Ltd.; and Karenz MT PE-1 from Showa Denko K.K.

In some embodiments of the present invention, the amount of the thiol compound in the epoxy based composition of the invention is from 0.5 to 50%, and preferably from 1 to 40% by weight based on the total weight of the composition.

Curing Catalyst

The curing catalyst of the present invention refers to any commonly used catalyst for epoxy systems, and includes but not limited to amine, imidazole and the derivatives thereof. Illustrative curing catalysts include methyldiethanolamine, triethanolamine, diethylaminopropylamine, benzyldimethyl amine, m-xylylenedi(dimethylamine), benzyldimethylamine, 2,4,6-tris(dimethylaminomethyl)phenol, 1-methylimidazole, 2-methylimidazole and 2,4-diethylimidazole.

Examples of commercially available curing catalysts, for example, are Ajicure PN-H from Ajinomoto Fine-Techno Co., Ltd.; Fujicure-FXR-1090FA from T&K Toka; 1,2-dimethyl imidazole from Shikoku Chemicals Corporation; and Gaskamine 240 from Mitsubishi Gas Chemical.

In some embodiments of the present invention, the amount of the curing catalysts in the epoxy based composition is from 0.1 to 20%, and preferably from 0.1 to 10% by weight based on the total weight of the composition.

Optional Additives
Epoxy Resin

The epoxy resin of the present invention refers to any common epoxy resin that is different from the epoxidized unsaturated polyolefin and is curable by the thiol compound. Exemplary of the epoxy resin includes but not limited to bisphenol A epoxy resins, bisphenol F epoxy resins, biphenyl epoxy resins, naphthalene epoxy resins, diphenyl ether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylolethane epoxy resins, and any combination thereof.

Examples of commercially available epoxy resin are, for example, D.E.R. 331 from Olin Corporation; EPON 828 from Shell Chemical Corporation; and EPICLON N-665 from Dainippon Ink and Chemicals Inc. In some embodiments of the present invention, the amount of the epoxy resin in the epoxy based composition is from 0 to 80%, and preferably from 35 to 65% by weight based on the total weight of the composition.

Photo-Initiator

The photo-initiator of the present invention refers to any common photo-initiator and is preferably to include at least one free radical photo-initiator, for example selected from benzophenone, acetophenone, chlorinated acetophenone, dialkoxyacetophenones, dialkylhydroxyacetophenones, dialkylhydroxyacetophenone esters, benzoin acetate, benzoin, benzoin alkyl ethers, dimethoxybenzion, dibenzylketone, benzoylcyclohexanol and other aromatic ketones, acyloxime esters, acylphosphophine oxides, acylphosphosphonates, ketosulfides, dibenzoyldisulphides, diphenyldithiocarbonate, and dipheyl(2,4,6-trimethylbenzoyl) phosphine oxide.

Examples of commercially available photo-initiators include but not limited to Irgacure 184, Irgacure 500, Irgacure 907, Irgacure 369, Irgacure 379, Irgacure 127, Irgacure 1700, Irgacure 651, Irgacure 819, Irgacure 1000, Irgacure 1300, Irgacure1870, Darocur 1173, and Darocur TPO from BASF; Esacure KT046, Esacure KIP150, EsacureKT37 and Esacure EDB, from LAMBERTI; H-Nu 470 and H-Nu 470X, from Spectra Group Ltd.; and Genopol TX-1, from Rahn AG.

In some embodiments of the present invention, the amount of the photo-initiator is from 0 to 5%, and preferably from 1 to 4% by weight based on the total weight of the composition.

Others

In some embodiments of the present invention, a filler may be optionally added in the epoxy based composition. The filler includes but not limited to alumina, silica, and magnesia. Representative examples of the filler include TS720, from Cabot; and Aerosil R202, from Evonik.

In some embodiment of the present invention, an adhesion promoter may be optionally added in the epoxy based composition. The adhesion promoter may be silane coupling agents. Suitable silane coupling agent, include, but is not limited to, γ-am inopropyltriethoxysilane, γ-mercaptopropyltrimethoxysilane, γ-methacryloxypropyltrimethoxysilane, γ-glycidoxypropyltrimethoxylsilane, phenyltrimethoxysilane, and the like. Representative examples of the adhesion promoters include Silquest A-186, Silquest A-187, Silquest A-1110, Silquest A-1120, Silquest A-1170, Silquest A-2120, from Momentive.

In a preferred embodiment, the epoxy based composition comprises:
(a) from 1 to 90% by weight of at least one epoxidized unsaturated polyolefin;
(b) from 0.5 to 50% by weight of at least one thiol compound;
(c) from 0.1 to 20% by weight of at least one epoxy catalyst;
(d) from 0 to 80% by weight of at least one epoxy resin; and
(e) from 0 to 5% by weight of at least one photo-initiator; wherein the weight percentages of all components add up to 100% by weight.

In some embodiments of the present invention, the epoxy based composition is preferably free of acrylates and the derivatives thereof. Surprisingly, the epoxy based composition free of acrylates and the derivatives thereof still exhibits fast curing property under UV light and the adhesion strength of the composition is further improved after being heated.

The epoxy based composition of the present invention may be prepared by mixing all the components of the composition.

The UV curing time of the epoxy based composition in the present invention may be assessed by measuring the time to fix two glass plates adhered by the composition under UV radiation condition. A force is applied to the glass plates. At the time when there is no relative movement of the two glass plates, the time is recorded as the UV curing time of the epoxy based composition.

The epoxy based composition of the present invention preferably has a UV curing time less than or equal to 90 seconds, such as less than or equal to 65 seconds, less than or equal to 25 seconds, less than or equal to 10 seconds or less than or equal to 5 seconds.

The adhesion strength of the epoxy based composition in the present invention may be assessed by measuring the force at failure of the composition, which is applied to adhere two glass plates, according to ASTM D2095. The adhesion strength of the epoxy based composition after UV curing is recorded as T, and the adhesion strength of the epoxy based composition after UV curing and subsequent thermal curing is recorded as $T_t$. The improving rate (IR) of adhesion strength of the epoxy based composition after UV curing and subsequent thermal curing is calculated by the formula of:

$$IR=(T_t-T)/T.$$

The epoxy based composition of the present invention preferably has an improving rate (IR) of adhesion strength greater than or equal to 20, such as greater than or equal to 25, greater than or equal to 44, or greater than or equal to 64.

Test Methods

UV Curing Time of the Epoxy Based Composition

The UV curing time of the epoxy based composition was determined by measuring the time to fix two glass plates adhered by the composition, which was exposed under high pressure mercury lamp (Technoflux IH 153, Ushio 101 UV Meter at 365 nm) at 100 mW/cm². A force was applied to the glass plates. At the time when there was no relative movement of the two glass plates, the time was recorded as the UV curing time of the epoxy based composition.

Adhesion Strength Measurement Method of the Epoxy Based Composition

An epoxy based composition sample was applied to adhere two glass plates and was cured under high pressure mercury lamp (Technoflux IH 153, Ushio 101 UV Meter at 365 nm) at 100 mW/cm². The adhesion strength of the epoxy based composition after UV curing was determined according to ASTM D2095 at a crosshead speed of 2 mm/min and recorded as T.

Another epoxy based composition sample with the same components was applied to adhere two glass plates and was cured under high pressure mercury lamp (Technoflux IH 153, Ushio 101 UV Meter at 365 nm) at 100 mW/cm². The epoxy based composition sample was further heated at a desired temperature for curing. The adhesion strength of the epoxy based composition after UV curing and subsequent thermal curing was determined according to ASTM D2095 at a crosshead speed of 2 mm/min and recorded as $T_t$.

Improving Rate (IR) of Adhesion Strength of the Epoxy Based Composition after UV Curing and Subsequent Thermal Curing The improving rate (IR) of adhesion strength of the epoxy based composition after UV curing and subsequent thermal curing was calculated by the formula of:

$$IR=(T_t-T)/T.$$

Example 1-7

Epoxy based composition samples were prepared according to Table 1, by mixing the components selected from: bisphenol A epoxy resin (D.E.R. 331, from Olin Corporation);
epoxidized polybutadiene (JP 400, from Nippon Soda Co., Ltd.);
epoxidized polybutadiene (PB 3600, from Daicel Corporation);
trimethylolpropane tris(3-mercaptopropionate) (TMTP, from Yodo Kagaku Co., Ltd.);
pentaerythritol tetrakis (3-mercaptopropionate) (PEMP, from SC Organic Chemical Co., Ltd.); 2-hydroxy-2-methyl-1-phenyl-propan-1-one (Darocure 1173, from BASF); amine adduct type epoxy curing agent (Ajicure PN-H, from Ajinomoto Fine-Techno Co., Ltd.); and 1,2-dimethyl imidazole (from Shikoku Chemicals Corporation).

TABLE 1A

Epoxy based composition

| Components | Weight % | | | | | | |
| --- | --- | --- | --- | --- | --- | --- | --- |
| | Example 1 | Example 2 | Example 3 | Example 4 | Example 5 | Example 6 | Example 7 |
| D.E.R. 331 | 37 | 43 | 64 | | 71 | 56 | 43.9 |
| JP 400 | 25 | | | 65 | 25 | | |
| PB 3600 | | 20 | 20 | | | 40 | 20.4 |
| TMTP | 35 | | | | | | |
| PEMP | | 35 | 8 | 30 | | | 35.7 |
| Darocure 1173 | | | 1 | | 1 | 1 | |
| Ajicure PN-H | 3 | 2 | 7 | | 3 | 3 | |
| 1,2-dimethyl imidazole | | | | 5 | | | |

In Table 2, the UV curing time of the epoxy based composition samples is reported. The epoxy based composition samples in Example 5 and 6 were not cured after being exposed under UV light for 300 seconds.

When the epoxy resin was added to the epoxy based composition samples as shown in Example 1 to 3 compared with Example 4, the UV curing time of the epoxy based composition was significantly shortened.

TABLE 2

UV curing time of the epoxy based composition

|  | Example 1 | Example 2 | Example 3 | Example 4 | Example 5 | Example 6 | Example 7 |
|---|---|---|---|---|---|---|---|
| UV curing time (s) | 10 | 25 | 5 | 65 | No cure | No cure | 25 |

In Table 3, the adhesion strength and the improving rate (IR) of adhesion strength of the epoxy based composition samples are reported. The epoxy based composition samples in Example 1 to 3 and 7 were exposed under UV light for 30 seconds, and then heated at 120° C. for 30 minutes; the epoxy based composition sample in Example 4 were exposed under UV light for 90 seconds, and then heated at 180° C. for 30 minutes; and the epoxy based composition samples in Example 5 and 6 were exposed under UV light for 300 seconds.

The adhesion strength of the epoxy based composition samples in Example 1 to 4 was relatively weak after UV curing, but was greatly enhanced after the epoxy based composition samples were further heated.

When the thiol compound was missing from the formula of epoxy based composition as shown in Example 5 and 6, the epoxy based composition samples could not be cured after being exposed under UV light at 100 mW/cm$^2$ for 300 seconds. Consequently, the adhesion strength after UV curing and subsequent thermal curing of the epoxy based composition samples in Example 5 and 6 could not be obtained.

When the curing catalyst was missing from the formula of epoxy based composition as shown in Example 7, the epoxy based composition sample was cured under UV light. However, when the epoxy based composition sample was further heated, the adhesion strength of the epoxy based composition sample was not improved much.

TABLE 3

Adhesion strength and improving rate (IR) of adhesion strength of the epoxy based composition after UV curing and subsequent thermal curing.

|  | Example 1 | Example 2 | Example 3 | Example 4 | Example 5 | Example 6 | Example 7 |
|---|---|---|---|---|---|---|---|
| Adhesion strength after UV curing (T), N/mm$^2$ | 0.04 | 0.027 | 0.028 | 0.066 | Not applicable | Not applicable | 0.064 |
| Adhesion strength after UV curing and subsequent thermal curing (T$_t$), N/mm$^2$ | 1.05 | 1.75 | 1.28 | 3.00 | Not applicable | Not applicable | 0.14 |
| Improving rate (IR) of adhesion strength | 25.25 | 63.81 | 44.71 | 44.45 | Not applicable | Not applicable | 1.19 |

What is claimed is:

1. A photocurable epoxy based composition comprising:
   (a) from 3 to 35% by weight of at least one epoxidized unsaturated polyolefin;
   (b) from 1 to 40% by weight of at least one thiol compound;
   (c) from 0.1 to 10% by weight of at least one curing catalyst;
   (d) from 35 to 65% by weight of at least one epoxy resin which epoxy resin is different from the at least one epoxidized unsaturated polyolefin; and
   (e) optionally up to 5% by weight of at least one photo-initiator, wherein the weight percentages of all components (a)-(e) are based on the total weight of the composition.

2. The photocurable epoxy based composition according to claim 1, wherein the at least one epoxidized unsaturated polyolefin comprises an epoxidized polydiene or any combination thereof.

3. The photocurable epoxy based composition according to claim 1, wherein the at least one epoxidized unsaturated polyolefin has at least two epoxy groups.

4. The photocurable epoxy based composition according to claim 1, wherein the at least one epoxidized unsaturated polyolefin has at least two non-aromatic carbon-carbon double bonds.

5. The photocurable epoxy based composition according to claim 1, wherein the at least one thiol compound has at least two thiol groups.

6. The photocurable epoxy based composition according to claim 1, wherein the at least one curing catalyst is selected from at least one of amine, imidazole and the derivatives thereof.

7. The photocurable epoxy based composition according to claim 1, further comprising optional additives of filler, adhesion promoter or any combination thereof.

8. The photocurable epoxy based composition according to claim 1, wherein the at least one photo-initiator is present.

9. The photocurable epoxy based composition according to claim 1, which is both photocurable and thermal curable.

10. The photocurable epoxy based composition according to claim 1, wherein the epoxy based composition is free of acrylate and the derivatives thereof.

11. The photocurable epoxy based composition according to claim 1, having a UV curing time less than or equal to 90 seconds.

12. The photocurable epoxy based composition according to claim 9, having an improving rate (IR) of adhesion strength greater than or equal to 20 after UV curing and subsequent thermal curing.

13. A cured product of the photocurable epoxy based composition according to claim 1.

14. An article bonded by the photocurable epoxy based composition according to claim 1.

* * * * *

UNITED STATES PATENT AND TRADEMARK OFFICE
CERTIFICATE OF CORRECTION

PATENT NO. : 11,390,742 B2  
APPLICATION NO. : 17/004196  
DATED : July 19, 2022  
INVENTOR(S) : Chunfu Chen et al.

Page 1 of 1

It is certified that error appears in the above-identified patent and that said Letters Patent is hereby corrected as shown below:

In the Specification

Column 4, Line 50 change "y-am inopropyltriethoxysilane" to --y-aminopropyltriethoxysilane--.

Signed and Sealed this  
Fourteenth Day of November, 2023

Katherine Kelly Vidal  
*Director of the United States Patent and Trademark Office*